(12) United States Patent
Choi et al.

(10) Patent No.: US 8,030,858 B2
(45) Date of Patent: Oct. 4, 2011

(54) INVERTER CIRCUIT, BACKLIGHT DEVICE AND LIQUID CRYSTAL DISPLAY HAVING THE SAME

(75) Inventors: Min-Soo Choi, Cheonan-si (KR); Osamu Sengoku, Tokyo (JP); Tatsuhisa Shimura, Tokyo (JP)

(73) Assignee: Samsung Electronics Co., Ltd. (KR)

( * ) Notice: Subject to any disclaimer, the term of this patent is extended or adjusted under 35 U.S.C. 154(b) by 414 days.

(21) Appl. No.: 12/262,396

(22) Filed: Oct. 31, 2008

(65) Prior Publication Data

US 2009/0261755 A1 Oct. 22, 2009

(30) Foreign Application Priority Data

Apr. 16, 2008 (KR) ................. 10-2008-0035299

(51) Int. Cl.
H05B 37/00 (2006.01)
H05B 39/00 (2006.01)
H05B 41/00 (2006.01)

(52) U.S. Cl. .................... 315/312; 315/209 R

(58) Field of Classification Search .................. 315/312, 315/209 R, 224, 307
See application file for complete search history.

(56) References Cited

U.S. PATENT DOCUMENTS

| 7,411,355 B2 * | 8/2008 | Jang et al. ................. 315/209 R |
| 7,800,318 B2 * | 9/2010 | Hsu ................. 315/308 |
| 2007/0108918 A1 | 5/2007 | Sengoku et al. |

FOREIGN PATENT DOCUMENTS

| JP | 2000092865 | 3/2000 |
| JP | 2006085962 | 3/2006 |
| JP | 2007141802 | 6/2007 |
| KR | 1020060034462 | 4/2006 |
| KR | 1020070052394 | 5/2007 |

* cited by examiner

*Primary Examiner* — Daniel D Chang
(74) *Attorney, Agent, or Firm* — Cantor Colburn LLP

(57) ABSTRACT

An inverter circuit for a backlight device includes an inverter transformer which supplies a high AC voltage to a plurality of discharge tubes, a filter circuit connected to an output terminal of the inverter transformer, and an abnormal discharge detection circuit. The filter circuit passes a current signal having a high frequency component of the high AC voltage to the abnormal discharge detection circuit, and the abnormal discharge detection circuit detects an abnormal discharge current based on the current signal.

18 Claims, 11 Drawing Sheets

Inverter Output Current Io (in normal state)

Inverter Output Current Io (in arc discharge)

INVERTER CIRCUIT, BACKLIGHT DEVICE AND LIQUID CRYSTAL DISPLAY HAVING THE SAME

This application claims priority to Korean Patent Application No. 2008-35299, filed on Apr. 16, 2008, and all the benefits accruing therefrom under 35 U.S.C. §119, the contents of which in its entirety are herein incorporated by reference.

BACKGROUND OF THE INVENTION

1. Field of the Invention

The present invention relates to an inverter circuit and, more particularly, to an inverter circuit which controls discharge tubes of a plurality of cold cathode fluorescent lamps ("CCFLs") of a liquid crystal display ("LCD"), a backlight device having the inverter circuit and an LCD having the backlight device.

2. Description of the Related Art

A liquid crystal display ("LCD") is a common type of display apparatus. The LCD is not a self-emissive display apparatus, however, and therefore requires a separate light source, such as a cold cathode fluorescent lamp ("CCFL"), for example.

The CCFL is a type of a fluorescent lamp. Compared to other lamp types, such as a heat cathode fluorescent lamp ("HCFL"), for example, the CCFL is highly resistant to vibration, has a relatively small diameter and has a long lifespan. However, a higher driving voltage must be applied to the CCFL than to the HCFL, since the CCFL is turned on and off in response to a high AC voltage.

Due to the high AC voltage, an abnormal discharge, such as a corona discharge or an arc discharge, for example, may occur between a high voltage section and a ground in an inverter circuit which generates the high AC voltage to operate the CCFL. The abnormal discharge carbonizes a peripheral section of the CCFL and also causes additional problems, such as short-circuits, fires and smoking during operation.

FIG. 1 is a block diagram of a backlight device of the prior art. Referring to FIG. 1, a backlight device 1 of the prior art includes an inverter circuit 2 which generates a high AC voltage, a CCFL group 3 having a plurality of CCFLs, and a condenser circuit 4 having a plurality of balance condensers BC which uniformly distributes the high AC voltage from the inverter circuit 2 to the plurality of CCFLs.

The inverter circuit 2 of the backlight device 1 of the prior art is typically a concentrative power supply-type inverter circuit 2 which turns on and off CCFLs of the plurality of CCFLs. The inverter circuit 2 also prevents electric current from being concentrated in a particular CCFL, such as in a CCFL which turns on before other CCFLs due to a negative resistance characteristic of that particular CCFL, for example. Specifically, the inverter circuit 2 prevents the electric current from being concentrated in a particular CCFL by connecting a corresponding balance condenser BC the CCFL having the negative resistance characteristic.

In the backlight device 1 having the concentrative power supply-type inverter circuit 2, however, an arc discharge occurs around the CCFLs. A current applied to the CCFLs is limited by the balance condensers, however, and an output current Io of the inverter circuit 2 is therefore not substantially affected by the arc discharge. Thus, the inverter circuit 2 is unable to detect the arc discharge detected based on the output current Io.

FIG. 2A is a graph of an output current of the inverter circuit of the prior art when arc discharge is not occurring, e.g., in a normal operating state, and FIG. 2B is a graph of an output current of the inverter circuit of the prior art when an arc discharge is occurring.

As shown in FIGS. 2A and 2B, a change in respective output waveforms of the output current $I_o$ due to the occurrence of an arc discharge is small, and the arc discharge is therefore not easy to detect. However, it is required to detect the arc discharge to block a power supply operation of the inverter circuit, since the arc discharge damages the CCFLs. Thus, it is desired to develop an inverter circuit capable of detecting an arc discharge to block a power supply operation, thereby effectively preventing damage to the CCFLs.

BRIEF SUMMARY OF THE INVENTION

An exemplary embodiment of the present invention provides an inverter circuit which detects a high-voltage abnormal discharge (e.g., an arc discharge) by detecting an output current of an inverter transformer, as well as a current having a high frequency band from the output current detected by the inverter circuit.

An alternative exemplary embodiment of the present invention provides a backlight device having the inverter circuit Another alternative exemplary embodiment of the present invention provides a liquid crystal display ("LCD") including the backlight device.

In an exemplary embodiment of the present invention, an inverter circuit includes an inverter transformer, a filter circuit, and an abnormal discharge detection circuit. The inverter transformer supplies a high AC voltage to a plurality of discharge tubes. The filter circuit is connected to an output terminal of the inverter transformer. The abnormal discharge detection circuit is connected to the filter circuit. The filter circuit passes a current signal having a high frequency component of the high AC voltage to the abnormal discharge detection circuit, and the abnormal discharge detection circuit detects an abnormal discharge current based on the current signal.

The abnormal discharge detection circuit includes a differential circuit, a serial resonant circuit, a detection circuit, a peak hold circuit and a level detection circuit. The differential circuit is connected to an output terminal of the filter circuit to output a differential signal based on the current signal having the high frequency component of the high AC voltage. The serial resonant circuit is connected to an output terminal of the differential circuit to amplify the differential signal and output an amplified differential signal. The detection circuit is connected to an output terminal of the serial resonant circuit to receive the amplified differential signal therefrom and output a detection signal based on the amplified differential signal. The peak hold circuit is connected to an output terminal of the detection circuit to maintain a peak level of the detection signal. The level detection circuit is connected to an output terminal of the peak hold circuit and detects the peak level maintained by the peak hold circuit.

The abnormal discharge detection circuit further includes an arc discharge determiner. The arc discharge determiner is connected with an output terminal of the level detection circuit to detect the abnormal discharge current based on the peak level detected by the level detection circuit.

The filter circuit includes a high pass filter.

The differential circuit includes a current detection transformer. The current detection transformer is connected to the output terminal of the filter circuit to detect the current signal having the high frequency component of the high AC voltage.

The plurality of discharge tubes includes a cold cathode fluorescent lamp ("CCFL"), and an operation of the inverter transformer is controlled based on the abnormal discharge current detected by the abnormal discharge detection circuit.

In an alternative exemplary embodiment of the present invention, a backlight device includes a plurality of discharge tubes, an inverter transformer, a filter circuit and an abnormal discharge detection circuit. The inverter transformer supplies a high AC voltage to the plurality of discharge tubes. The filter circuit is connected to an output terminal of the inverter transformer. The abnormal discharge detection circuit is connected to the filter circuit. The filter circuit passes a current signal having a high frequency component of the high AC voltage to the abnormal discharge detection circuit, and the abnormal discharge detection circuit detects an abnormal discharge current based on the current signal.

The abnormal discharge detection circuit includes a differential circuit, a serial resonant circuit, a detection circuit, a peak hold circuit and a level detection circuit. The differential circuit is connected to an output terminal of the filter circuit to output a differential signal based on the current signal having the high frequency component of the high AC voltage. The serial resonant circuit is connected to an output terminal of the differential circuit to amplify the differential signal and output an amplified differential signal. The detection circuit is connected to an output terminal of the serial resonant circuit to receive the amplified differential signal therefrom and output a detection signal based on the amplified differential signal. The peak hold circuit is connected to an output terminal of the detection circuit to maintain a peak level of the detection signal. The level detection circuit is connected to an output terminal of the peak hold circuit and detects the peak level maintained by the peak hold circuit.

The abnormal discharge detection circuit further includes an arc discharge determiner. The arc discharge determiner is connected to an output terminal of the level detection circuit to detect the abnormal discharge current based on the peak level detected by the level detection circuit.

The filter circuit includes a high pass filter.

The differential circuit includes a current detection transformer. The current detection transformer is connected to the output terminal of the filter circuit to detect the current signal having the high frequency component of the high AC voltage.

The plurality of discharge tubes comprises a cold cathode fluorescent lamp, and an operation of the inverter transformer is controlled based on the abnormal discharge current detected by the abnormal discharge detection circuit.

In yet another alternative exemplary embodiment of the present invention, an LCD includes a liquid crystal display panel, a backlight unit and an inverter circuit. The backlight unit includes a plurality of discharge tubes. The inverter circuit drives the backlight unit.

The inverter circuit includes an inverter transformer, a filter circuit and an abnormal discharge detection circuit. The inverter transformer supplies a high AC voltage to the backlight unit. The filter circuit is connected to an output terminal of the inverter transformer. The abnormal discharge detection circuit is connected to the filter circuit. An abnormal discharge detection circuit connected to the filter circuit, wherein the filter circuit passes a current signal having a high frequency component of the high AC voltage to the abnormal discharge detection circuit.

The abnormal discharge detection circuit includes a differential circuit, a serial resonant circuit, a detection circuit, a peak hold circuit and a level detection circuit. The differential circuit is connected to an output terminal of the filter circuit to output a differential signal based on the current signal having the high frequency component of the high AC voltage. The serial resonant circuit is connected to an output terminal of the differential circuit to amplify the differential signal and output an amplified differential signal. The detection circuit is connected to an output terminal of the serial resonant circuit to receive the amplified differential signal therefrom and output a detection signal based on the amplified differential signal. The peak hold circuit is connected to an output terminal of the detection circuit to maintain a peak level of the detection signal. The level detection circuit is connected to an output terminal of the peak hold circuit and detects the peak level maintained by the peak hold circuit.

The abnormal discharge detection circuit further includes a drive circuit, an arc discharge determiner and a controller. The drive circuit drives the inverter transformer. The arc discharge determiner is connected to an output terminal of the level detection circuit to detect the abnormal discharge current based on the detected peak level. The controller stops an operation of the drive circuit when the arc discharge determiner determines that an arc discharge has occurred.

The filter circuit includes a high pass filter.

The differential circuit includes a current detection transformer connected to the output terminal of the filter circuit to detect the current signal having the high frequency component of the high AC voltage.

In still another alternative exemplary embodiment of the present invention, an LCD includes a liquid crystal display panel, a backlight assembly, a lower container, an upper container, an inverter, and at least one optical sheet. The liquid crystal display panel displays an image. The backlight assembly includes a plurality of discharge tubes. The lower container receives the backlight assembly. The upper container prevents the liquid crystal display panel from being damaged. The inverter drives the backlight assembly. The at least one optical sheet is interposed between the liquid crystal display panel and the backlight assembly.

The inverter includes an inverter transformer, a filter circuit and an abnormal discharge detection circuit. The inverter transformer supplies a high AC voltage to the plurality of discharge tubes. The filter circuit is connected to an output terminal of the inverter transformer. The abnormal discharge detection circuit is connected to the filter circuit. The filter circuit passes a current signal having a high frequency component of the high AC voltage to the abnormal discharge detection circuit, and the abnormal discharge detection circuit detects an abnormal discharge current based on the current signal The abnormal discharge detection circuit includes a differential circuit, a serial resonant circuit, a detection circuit, a peak hold circuit and a level detection circuit. The differential circuit is connected to an output terminal of the filter circuit to output a differential signal based on the current signal having the high frequency component of the high AC voltage. The serial resonant circuit is connected to an output terminal of the differential circuit to amplify the differential signal output an amplified differential signal. The detection circuit is connected to an output terminal of the serial resonant circuit to receive the amplified differential signal therefrom and output a detection signal by detecting the amplified differential signal. The peak hold circuit is connected to an output terminal of the detection circuit to maintain a peak level of the detection signal. The level detection circuit is connected to an output terminal of the peak hold circuit and detects the peak level maintained by the peak hold circuit.

The differential circuit includes a current detection transformer connected to the output terminal of the filter circuit to detect the current signal having the high frequency component of the high AC voltage.

The abnormal discharge detection circuit further includes a drive circuit which drives the inverter transformer, an arc discharge determiner connected to an output terminal of the level detection circuit to detect the abnormal discharge current based on the peak level detected by the level detection circuit, and a controller which stops an operation of the drive circuit when the arc discharge determiner determines that an arc discharge has occurred.

The filter circuit includes a high pass filter.

According to exemplary embodiments of the present invention, a high-voltage abnormal discharge (e.g. an arc discharge), which occurs when the high AC voltage is supplied to a plurality of CCFLs, is accurately detected by the abnormal discharge detection circuit.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
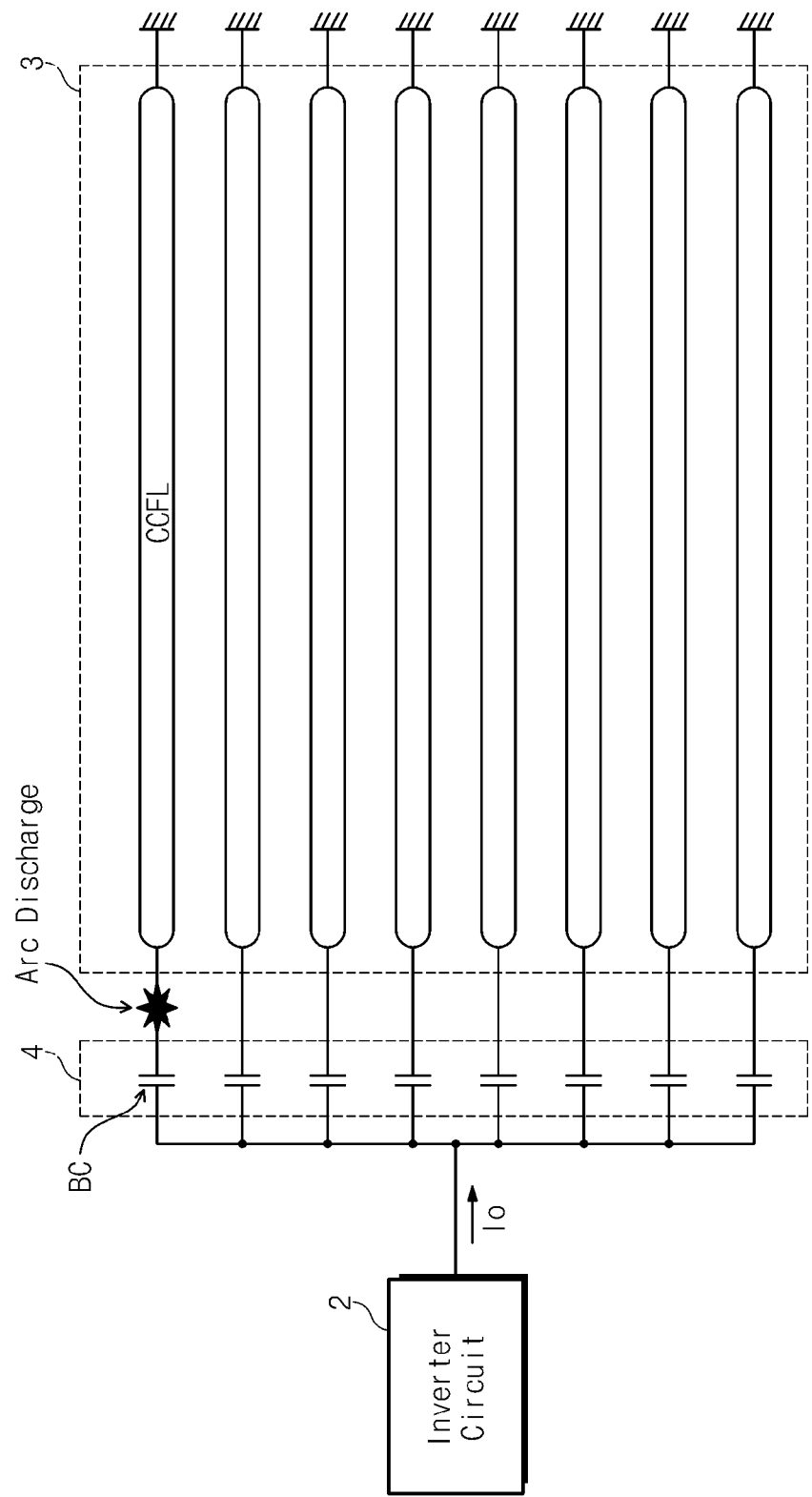
FIG. 1 is a block diagram of a backlight device of the prior art.
Figure 2A:
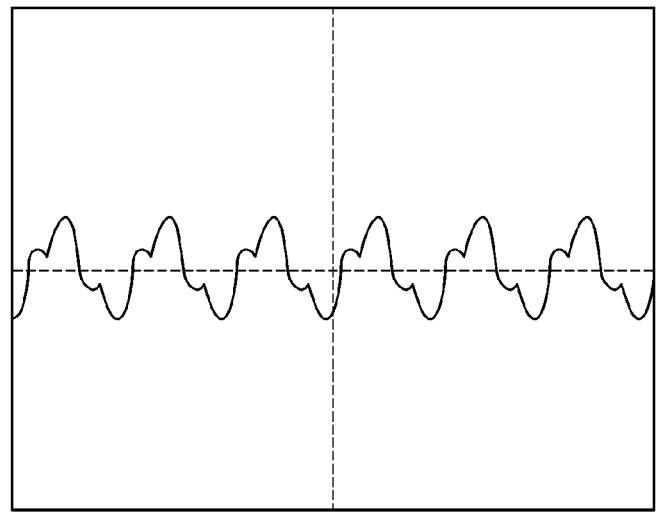
FIG. 2A is a graph of an output current waveform of the inverter of the prior art in a normal operating state.
Figure 2B:
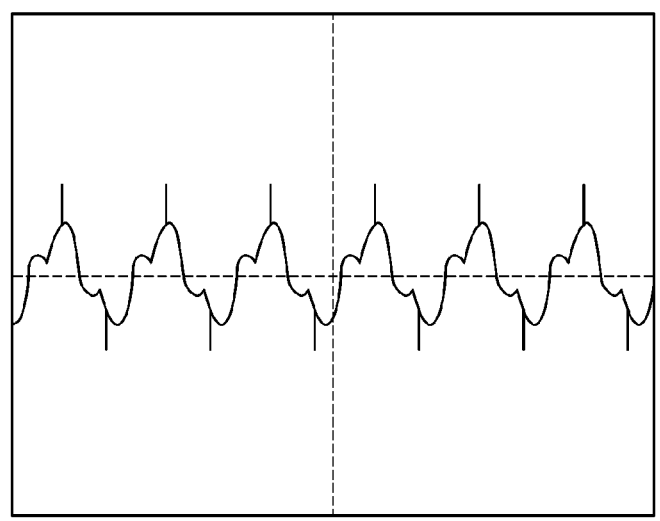
FIG. 2B is a graph of an output current waveform of the inverter of the prior art in an arc discharge operating state.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be explained in further detail with reference to the accompanying drawings.

Figure 3:
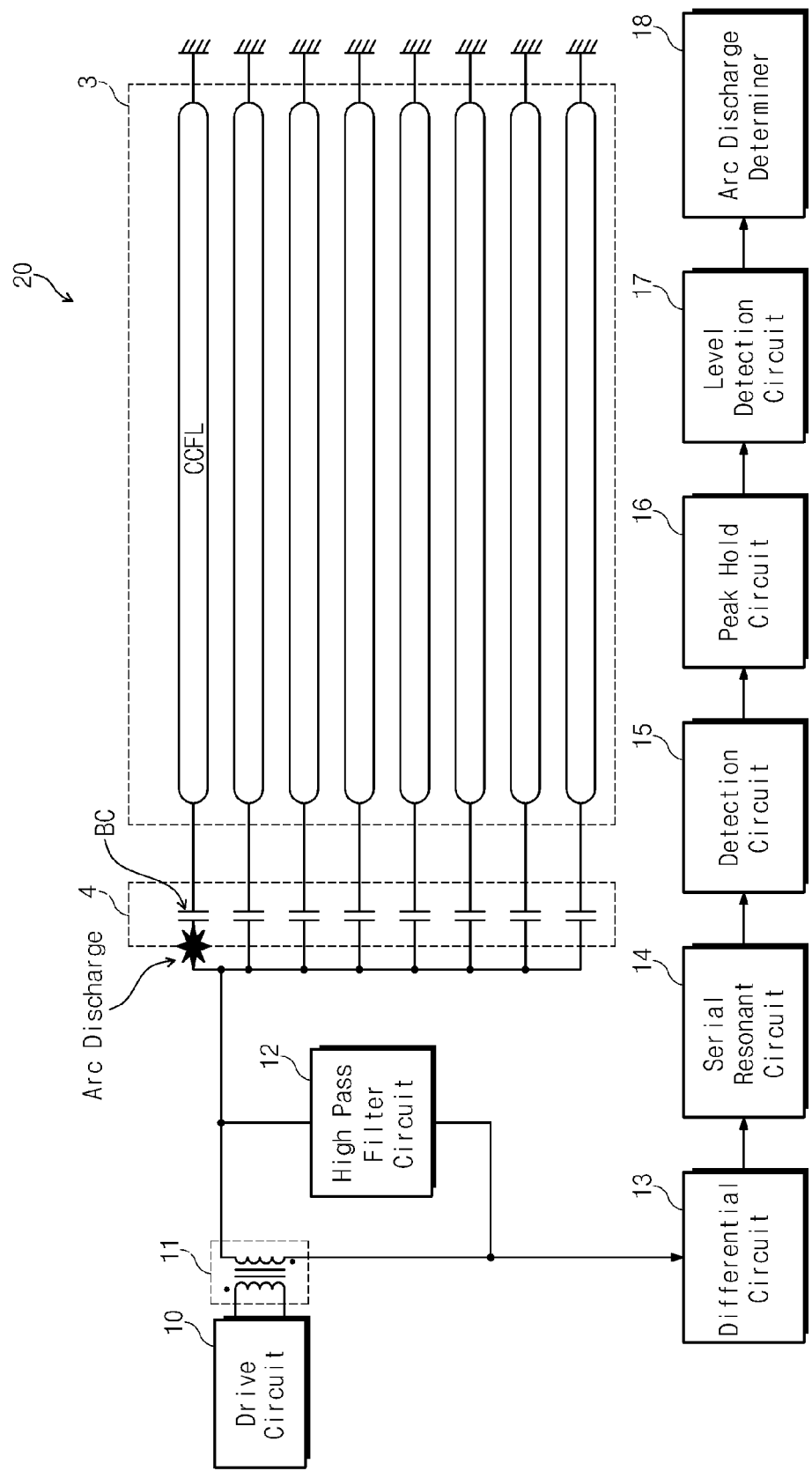
FIG. 3 is a block diagram of a backlight device according to an exemplary embodiment of the present invention.

FIG. 3 is a block diagram of a backlight device having an inverter circuit according to an exemplary embodiment of the present invention.

Referring to FIG. 3, the backlight device 20 includes a cold cathode fluorescent lamp ("CCFL") group 3 including CCFLs, a condenser circuit 4 including a plurality of balance condensers BC, and a drive circuit 10. The backlight device 20 further includes an inverter circuit including an inverter transformer 11, a high pass filter circuit 12, a differential circuit 13, a serial resonant circuit 14, a detection circuit 15, a peak hold circuit 16, a level detection circuit 17 and an arc discharge determiner 18.

As will be described in greater detail below with reference to FIGS. 4 and 5, the drive circuit 10 includes a power source, a switch device and a bridge circuit, for example, and supplies a half wave-rectified voltage to the inverter transformer 11. The inverter transformer 11 generates a high AC voltage having a predetermined resonance frequency from the voltage supplied from the drive circuit 10.

Figure 4:
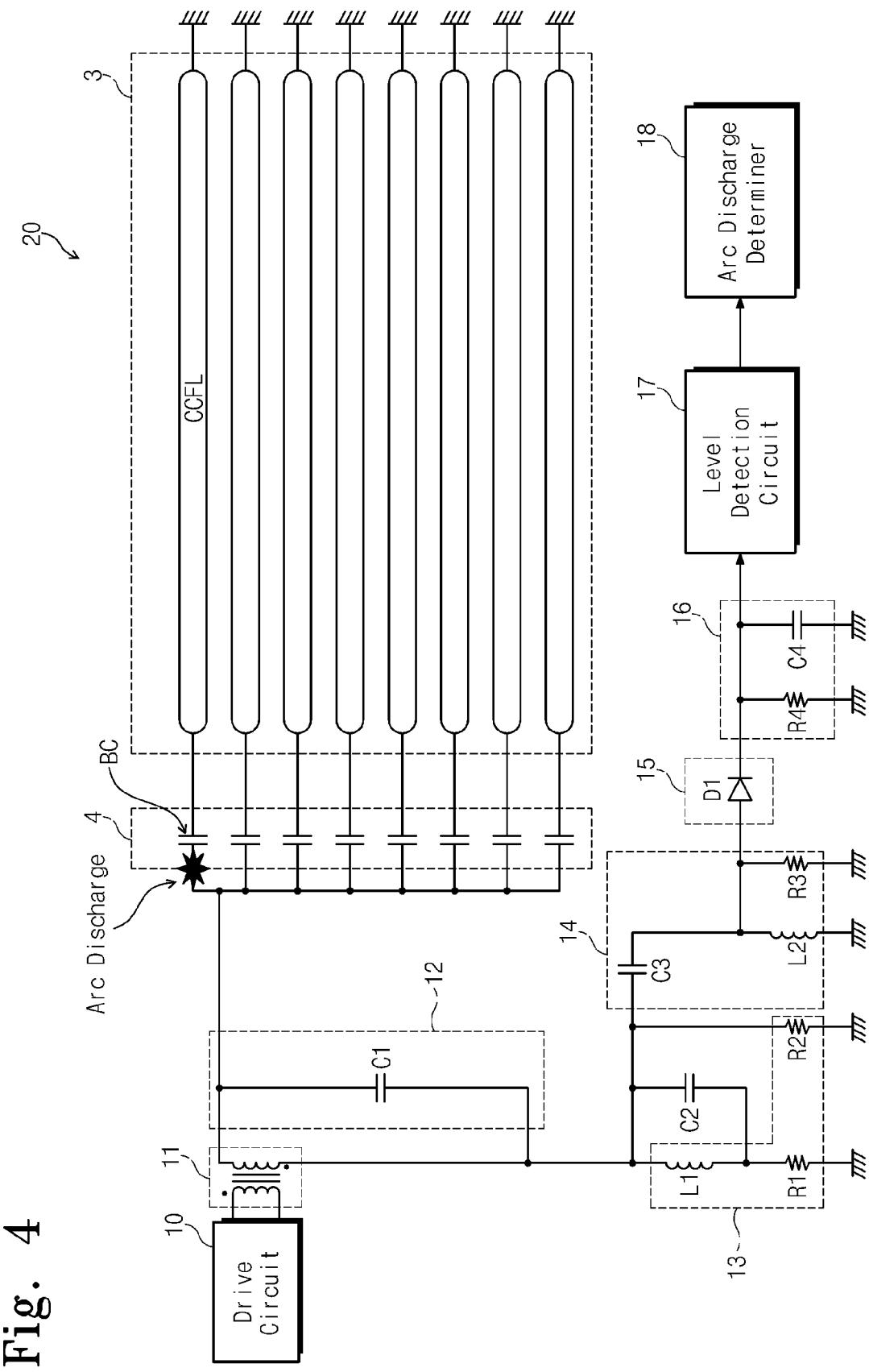
FIGS. 4 and 5 are block diagrams including individual schematic circuit diagrams of components of an inverter circuit of a backlight device according to an exemplary embodiment of the present invention.

The high pass filter circuit 12 is connected to a secondary output terminal of the inverter transformer 11, as shown in FIG. 4. The high pass filter circuit 12 has a high frequency bandpass characteristic which allows current in a predetermined high frequency band, e.g., having a predetermined high frequency component to pass therethrough. In an exemplary embodiment of the present invention, the current having the predetermined high frequency component is included in a current generated when the high AC voltage is generated from the inverter transformer 11.

The differential circuit 13 is connected to an output terminal of the high pass filter circuit 12. The differential circuit 13 differentiates the current signal having a high frequency band, which is outputted from the high pass filter circuit 12. The serial resonant circuit 14 is connected to an output terminal of the differential circuit 13. The serial resonant circuit 14 amplifies the differential signal and outputs an amplified differential signal output from the differential circuit 13.

The detection circuit 15 is connected to an output terminal of the serial resonant circuit 14. The detection circuit 15 outputs a detection signal by detecting a waveform of the amplified differential signal. The peak hold circuit 16 is connected to an output terminal of the detection circuit 15. The peak hold circuit 16 outputs a peak level signal by maintaining a peak level of the detection signal output from the detection circuit 15.

The level detection circuit 17 is connected to an output terminal of the peak hold circuit 16. The level detection circuit 17 outputs a level detection signal by detecting a voltage level of the peak level signal output from the peak hold circuit 16. The arc discharge determiner 18 is connected to an output terminal of the level detection circuit 17. The arc discharge determiner 18 determines whether an arc discharge has occurred by comparing the level detection signal output from the level detection circuit 17 to a predetermined reference level.

FIG. 4 is a block diagram including individual schematic circuit diagrams of components of an inverter circuit of a backlight device according to an exemplary embodiment of the present invention. More specifically, FIG. 4 is a block diagram including schematic circuit diagrams of the high pass filter circuit 12, the differential circuit 13, the serial resonant circuit 14, the detection circuit 15 and the peak hold circuit 16 of the backlight device 20 according to an exemplary embodiment of the present invention.

The high pass filter circuit 12 includes a first capacitor C1. A capacitance of the first capacitor C1 is set such that the first capacitor C1 has a predetermined high frequency bandpass characteristic which allows the current having the high frequency band to pass therethrough.

The differential circuit 13 includes a first coil L1, a first resistor R1 and a second resistor R2. The first coil L1, the first resistor R1 and the second resistor R2 have predetermined values such that they output a desired differential signal from the current signal having the high frequency band, which is then outputted from the high pass filter circuit 12.

A second capacitor C2 connected in parallel to the first coil L1 separates pulse noise, generated due to a switching operation of the inverter circuit, from pulse noise caused by an arc discharge.

The serial resonant circuit 14 includes a third capacitor C3, a second coil L2 and a third resistor R3. The third capacitor C3, the second coil L2 and the third resistor R3 have predetermined values such that they amplify a desired frequency signal (e.g., the pulse noise signal caused by the arc discharge) included in the differential signal output from the differential circuit 13.

The detection circuit 15 includes a diode D1. A desired threshold voltage of the diode D1 is determined based on an amplitude range of the differential signal amplified by the serial resonant circuit 14.

The peak hold circuit 16 includes a fourth resistor R4 and a fourth capacitor C4. The fourth resistor R4 and the fourth capacitor C4 have predetermined values such that they maintain the peak level of the detection signal output from the detection circuit 15.

Figure 5:
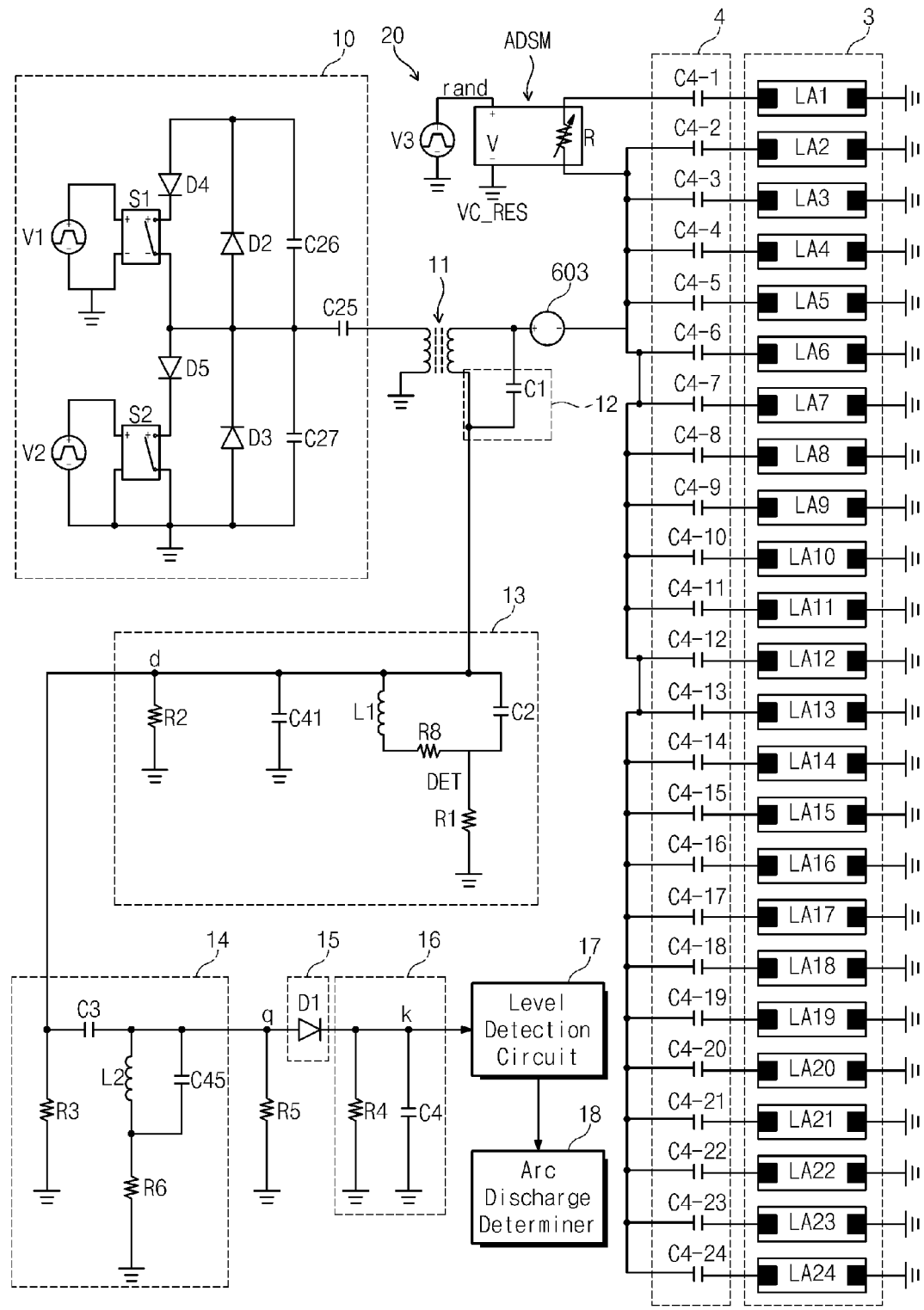

FIG. 5 is a block diagram including individual schematic circuit diagrams of components of an inverter circuit of a backlight device according to an exemplary embodiment of the present invention. More specifically, FIG. 5 includes schematic circuit diagrams of the drive circuit 10, as well as the high pass filter circuit 12, the differential circuit 13, the serial resonant circuit 14, the detection circuit 15 and the peak hold circuit 16 according to the exemplary embodiment of the present invention shown in FIG. 4.

The drive circuit 10 includes a first power source V1 and a second power source V2, a first switching device S1 and a second switching device S2, diodes D2 to D5 and capacitors C25 to C27, in which the first power source V1 and the second power source V2 generate pulse voltages having different phases at a same interval. The first switching device S1 and the second switching device S2 are switched by the pulse voltages generated from the first power source V1 and the second power source V2, respectively. In an exemplary embodiment of the present invention, the first switching device S1 and the second switching device S2 are metal oxide semiconductor field effect transistors ("MOS-FETs"). The diodes D2 to D5 constitute a bridge circuit which rectifies AC voltages switched by the first switching device S1 and the second switching device S2 to supply the rectified AC voltages to the inverter transformer 11.

An arc discharge simulation model ADSM provides a circuit generating voltage, similar to an arc discharge, based on voltage supplied from a third power source V3 using a variable resistor R. In the arc discharge simulation model ADSM, arc discharge occurs around a C4-1 of capacitors C4-1 through C4-24 in the condenser circuit 4.

The CCFL group 3 according to an exemplary embodiment includes CCFLs LA1 through LA24.

The high pass filter circuit 12 includes the first capacitor C1.

The differential circuit 13 includes the first coil L1, the first resistor R1 and the second resistor R2. As shown in FIG. 5, a capacitor C41 represents a parasitic capacitance of the first coil L1, and a resistor R8 represents an equivalent series resistance of the first coil L1.

The serial resonant circuit 14 includes the third capacitor C3, the second coil L2 and the third resistor R3. As shown in FIG. 5, a capacitor C45 represents a parasitic capacitance of the second coil L2, and a resistor R6 represents an equivalent series resistance of the second coil L2.

As also shown in FIG. 5, a fifth resistor R5 changes a voltage level of a differential signal, amplified by the serial resonant circuit 14 at a node q to a predetermined level based on a threshold voltage, for example, of the detection circuit 15.

The detection circuit 15 includes the diode D1. The peak hold circuit 16 includes the fourth resistor R4 and the fourth capacitor C4.

Figure 6:
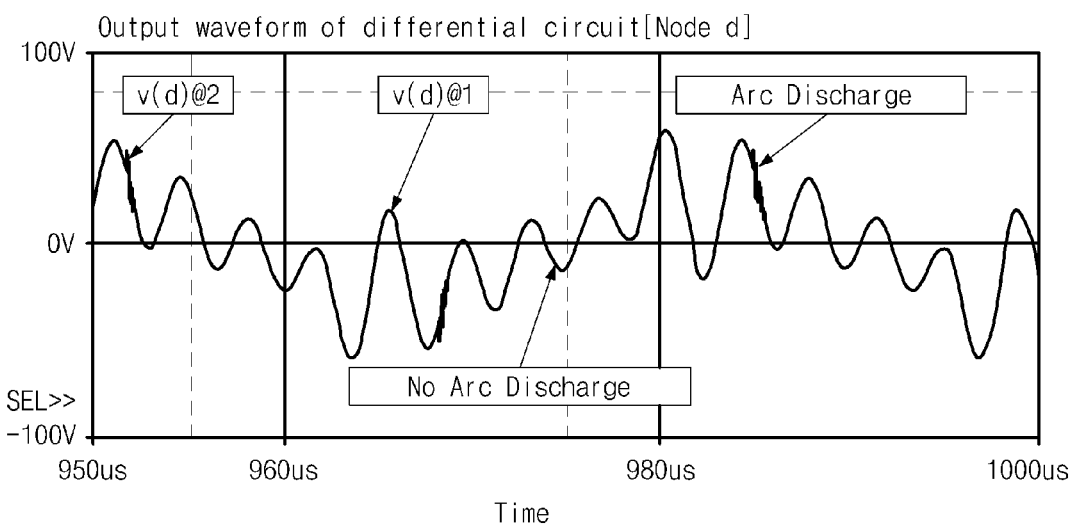
FIG. 6 is a graph of voltage versus time illustrating an output waveform at node d of the inverter circuit according to the exemplary embodiment of the present invention shown in FIG. 5.
Figure 7:
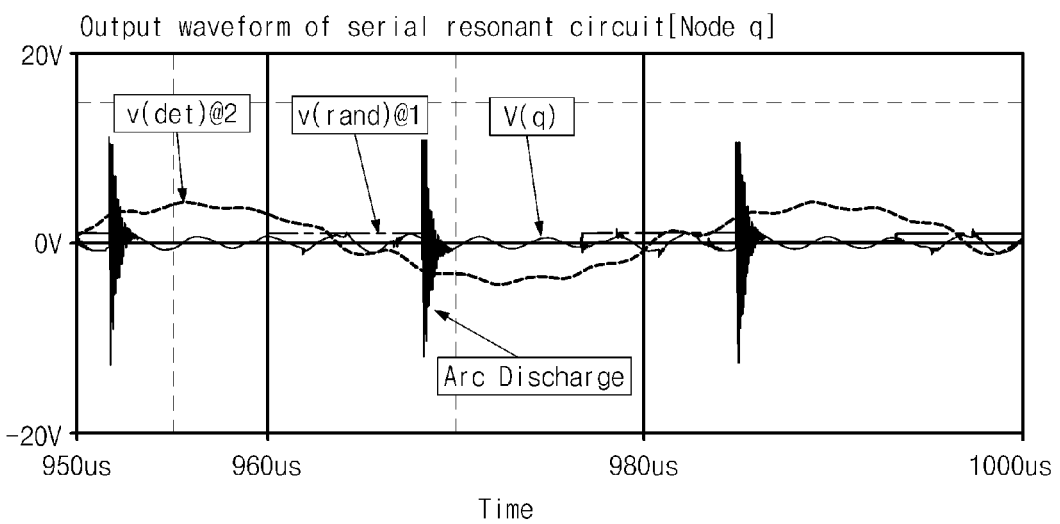
FIG. 7 is a graph of voltage versus time illustrating an output waveform at node q of the inverter circuit according to the exemplary embodiment of the present invention shown in FIG. 5.
Figure 8:
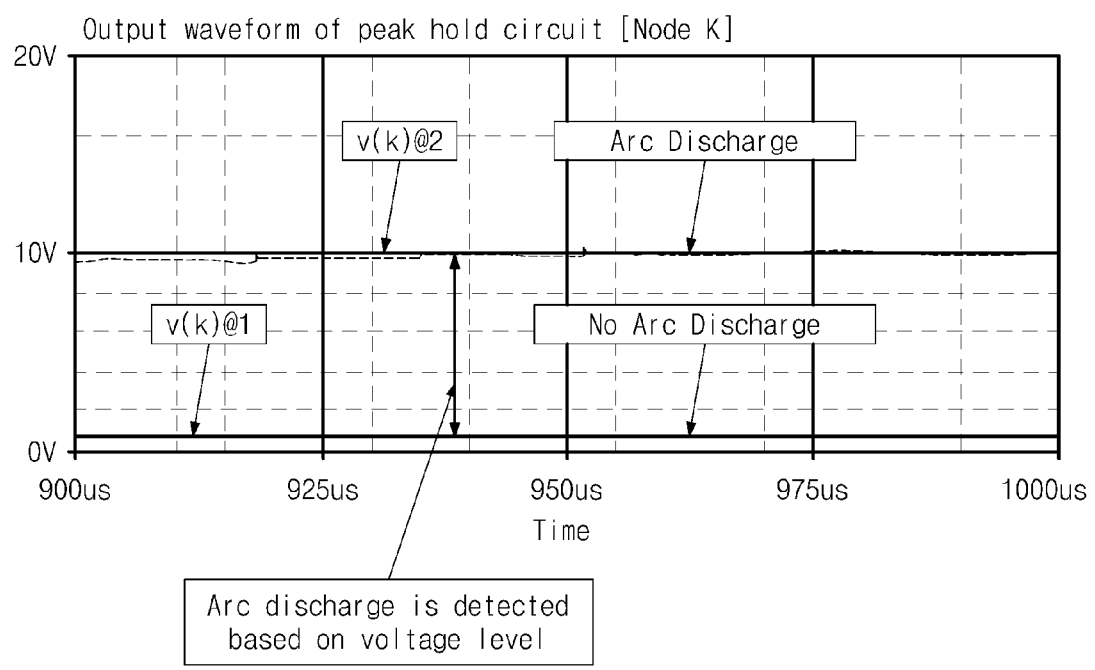
FIG. 8 is a graph of voltage versus time illustrating an output waveform at node k of the inverter circuit according to the exemplary embodiment of the present invention shown in FIG. 5.

FIGS. 6 to 8 are graphs illustrating output waveforms related to nodes d, q and k at respective output terminals of the differential circuit 13, the serial resonant circuit 14 and the peak hold circuit 16 when voltages are applied thereto based on the arc discharge simulation model ADSM shown in FIG. 5.

Specifically, FIG. 6 is a graph of voltage versus time illustrating output waveform at node d of the inverter circuit according to the exemplary embodiment of the present invention shown in FIG. 5. In FIG. 6, voltage V(d)@1 represents an output waveform of the differential signal including an arc discharge, and V(d)@2 represents an output waveform of the differential signal without an arc discharge.

FIG. 7 is a graph of voltage versus time illustrating an output waveform at node q of the inverter circuit according to the exemplary embodiment of the present invention shown in FIG. 5. Specifically, FIG. 7 is a graph of voltage versus time illustrating an output waveform at node q of the output terminal of the serial resonant circuit, and, more specifically, the output waveform related to an output terminal rand of the third power source V3 and the output waveform at node DET in the differential circuit 13. In FIG. 7, V(rand)@1 represents an output waveform of a voltage based on the arc discharge simulation model ADSM, V(DET)@2 represents an output waveform of a signal related to the node DET in the differential circuit 13, and V(q) represents an output waveform of an amplified differential signal including an arc discharge.

FIG. 8 is a graph of voltage versus time illustrating an output waveform at node k of the inverter circuit according to the exemplary embodiment of the present invention shown in FIG. 5. In FIG. 8, V(k)@1 represents an output waveform of the peak hold signal when an arc discharge has not occurred, and V(k)@2 represents an output waveform of the peak hold signal when an arc discharge has occurred.

Referring again to FIG. 5, the backlight device 20 includes the high pass filter circuit 12, the differential circuit 13, the serial resonant circuit 14, the detection circuit 15 and the peak hold circuit 16 to detect the arc discharge. Thus, as shown in FIG. 8, the arc discharge is detected based on a change in a voltage level of the peak hold signal output from the peak hold circuit 16. Specifically, in an exemplary embodiment of the present invention, a voltage level of approximately 0V indicates no arc discharge, while a voltage level of approximately 10V represents an arc discharge.

Thus, the level detection circuit 17 detects the voltage level of the peak hold signal maintained by the peak hold circuit 16 to output the level detection signal to the arc discharge determiner 18. Then, the arc discharge determiner 18 determines whether an abnormal discharge, e.g., an arc discharge, has occurred by comparing the level detection signal that is output from the level detection circuit 17 with the predetermined reference level, e.g., 0V or 10V, as shown in FIG. 8. When an abnormal discharge has occurred, the arc discharge determiner 18 outputs an abnormal discharge detection signal to an external control circuit (not shown) which stops an operation of the drive circuit 10 and/or the inverter circuit to prevent damage to CCFLs of the CCFL group 3.

Further, in an exemplary embodiment of the present invention, the backlight device 20 includes a concentrative power supply-type inverter circuit which uniformly supplies the high AC voltage to a plurality of the CCFLs in the CCFL part 3 by using the balance condensers BC. Further, the high pass filter circuit 12 is connected to a supply line of the high AC voltage, which is the output terminal of the inverter transformer 11, and the differential circuit 13, the serial resonant circuit 14, the detection circuit 15, the peak hold circuit 16, the level detection circuit 17 and the arc discharge determiner 18 are sequentially connected to the high pass filter circuit 12, as best shown in FIGS. 4 and 5.

Thus, in the concentrative power supply-type inverter circuit according to an exemplary embodiment of the present invention, when an arc discharge occurs or has occurred, arc noise components which overlap an output current applied to the supply line of the high AC voltage is effectively and accurately detected. Further, when the arc discharge occurs or has occurred, the abnormal discharge detection signal is output to a control circuit (not shown) which controls the operation of the inverter circuit. As a result, when the arc discharge has occurred, an operation of the inverter circuit is immediately stopped, and thus the backlight device is effectively prevented from being damaged.

Figure 9:
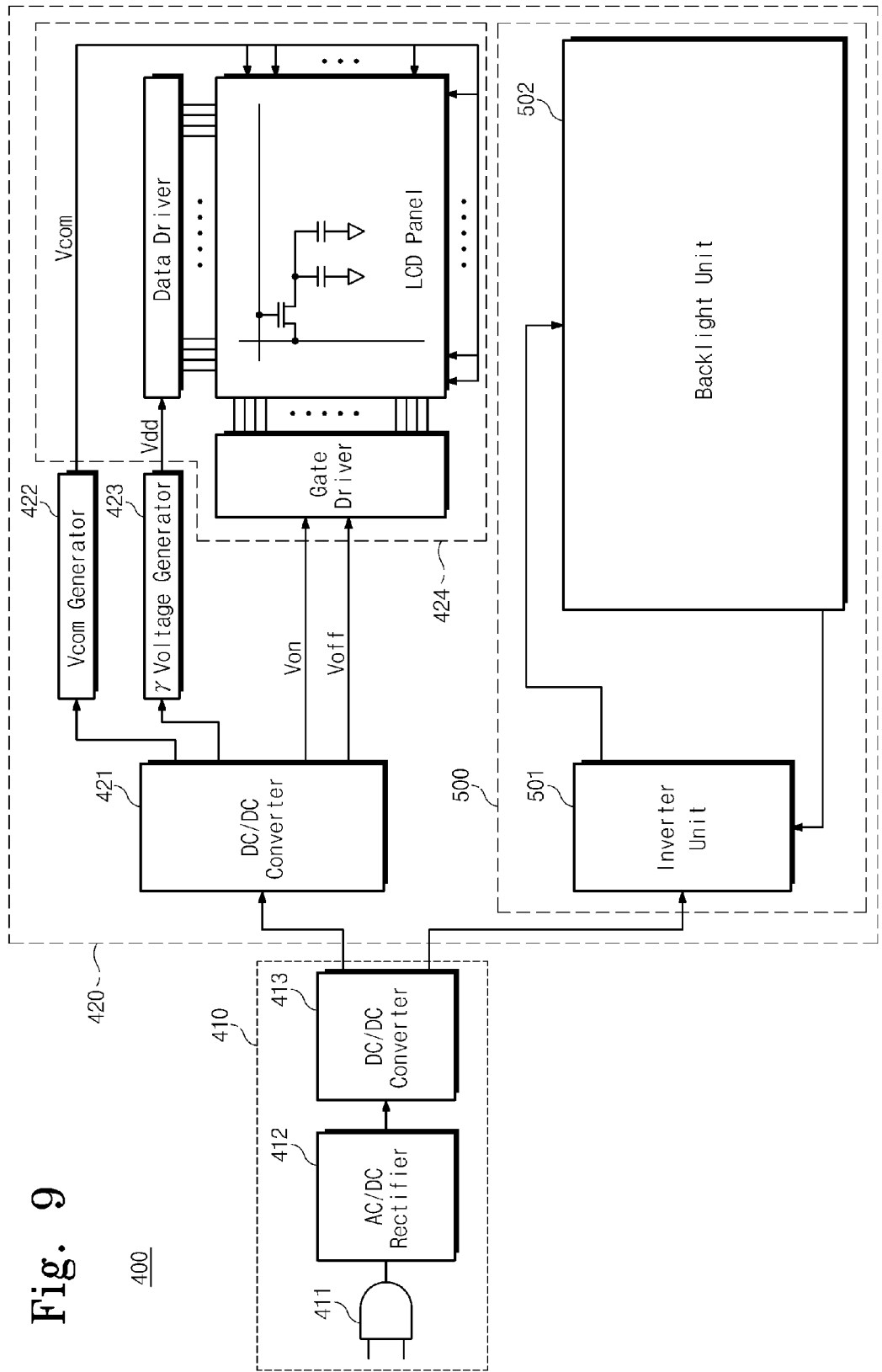
FIG. 9 is a block diagram of a liquid crystal display ("LCD") according to an alternative exemplary embodiment of the present invention.

Hereinafter, a liquid crystal display ("LCD") including the backlight device 20 according to the exemplary embodiment of the present invention shown in FIG. 5 will be described in further detail with reference to FIG. 9, which is a block diagram of an LCD according to an alternative exemplary embodiment of the present invention. As shown in FIG. 9, an LCD 400 includes an AC/DC power supply 410, an LCD module 420, and a backlight device 500 including an inverter unit 501 and a backlight unit 502.

The AC/DC power supply 410 includes an AND logic gate 411 an AC/DC rectifier 412 and a DC/DC converter 413. Further, the AC/DC power supply 410 converts an external general AC supply voltage, such as 100V or 240V, for example, but not being limited thereto, to a DC supply voltage and then outputs the DC supply voltage to the LCD module 420.

The LCD module 420 includes a DC/DC converter 421, a Vcom generator 422, a gamma ("γ") voltage generator 423, an LCD panel unit 424 and the backlight device 500. In an exemplary embodiment of the present invention, the LCD module 420 displays an image in response to image data input from an external graphic controller (not shown).

The Vcom generator 422 generates a common electrode voltage Vcom based on DC voltage having a converted level supplied from the DC/DC converter 421 to output the common electrode voltage Vcom to an LCD panel of the LCD panel unit 424.

The gamma voltage generator 423 generates a gamma voltage Vdd based on the DC voltage supplied from the DC/DC converter 421 to supply a data driver pf the LCD panel unit 424 with the gamma voltage Vdd. In FIG. 9, the Vcom generator 422 and the gamma voltage generator 423 are shown separate from the LCD panel unit 424. However, alternative exemplary embodiments of the present invention are not limited thereto. For example, the Vcom generator 422 and/or the gamma voltage generator 423 may be disposed in the LCD panel unit 424.

The DC/DC Converter 421 also supplies a gate-on voltage Von and a gate-off voltage Voff to a gate driver of the LCD panel unit 424, as shown in FIG. 9.

The backlight device 500 includes the inverter unit 501 and the backlight unit 502. The inverter unit 501 includes the drive circuit 10, the inverter transformer 11, the high pass filter circuit 12, the differential circuit 13, the serial resonant circuit 14, the detection circuit 15, the peak hold circuit 16, the level detection circuit 17 and the arc discharge determiner 18 shown in FIG. 5. The backlight unit 502 includes the CCFL group 3 and the condenser circuit 4 (best shown in FIG. 5). The inverter unit 501 and the backlight unit 502 are substantially the same as described above in greater detail with reference to FIGS. 3-5, and any repetitive detailed description thereof will hereinafter be omitted.

The LCD 400 includes the inverter unit 501 of the backlight device 500, which has the high pass filter circuit 12, the differential circuit 13, the serial resonant circuit 14, the detection circuit 15, the peak hold circuit 16, the level detection circuit 17 and the arc discharge determiner 18. Therefore, the LCD 400 detects arc noise components generated in the supply line of the high AC voltage in the inverter unit 501 when an arc discharge has occurred.

In an alternative exemplary embodiment of the present invention, the AC/DC power supply 410 may be disposed in the LCD module 420.

Figure 10:
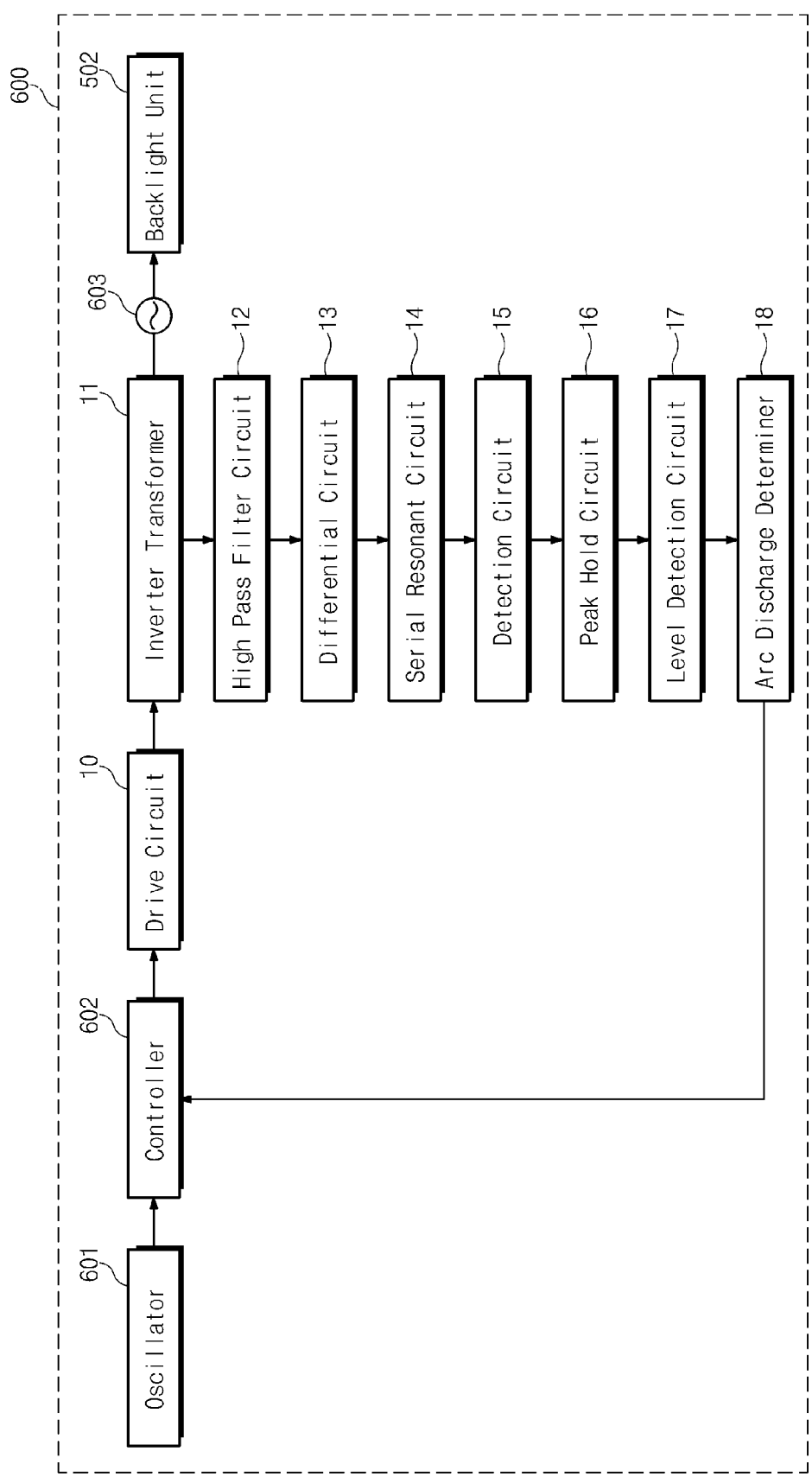
FIG. 10 is a block diagram of an LCD according to an alternative embodiment of the present invention.

FIG. 10 is a block diagram of an LCD according to an alternative exemplary embodiment of the present invention. In FIG. 10, the same reference numerals are assigned to the same or like elements as those of FIGS. 5 and 9, and any representative detailed description thereof will hereinafter be omitted. An LCD 600, as shown in FIG. 10, includes an oscillator 601, a controller 602, the drive circuit 10, the inverter transformer 11, the backlight unit 502, the high pass filter circuit 12, the differential circuit 13, the serial resonant circuit 14, the detection circuit 15, the peak hold circuit 16, the level detection circuit 17 and the arc discharge determiner 18. As shown in FIG. 10, the high AC voltage 603 is supplied to the backlight unit 502 from the inverter transformer 11.

If an arc discharge occurs in the backlight unit 502, the LCD 600 detects arc noise components with the high pass filter circuit 12, the differential circuit 13, the serial resonant circuit 14, the detection circuit 15, the peak hold circuit 16, the level detection circuit 17 and the arc discharge determiner 18, and thereby provides an abnormal discharge detection signal to the controller 602 through the arc discharge determiner 18.

When the abnormal discharge detection signal is received from the arc discharge determiner 18, the controller 602 stops operation of the drive circuit 10, and thereby effectively prevents the high AC voltage from being supplied to the backlight unit 502 from the inverter transformer 11. Thus, when the arc discharge occurs, operation of the drive circuit 10 and the inverter transformer 11 are stopped, and damage or a defect is effectively prevented from occurring due to the arc discharge.

Figure 11:
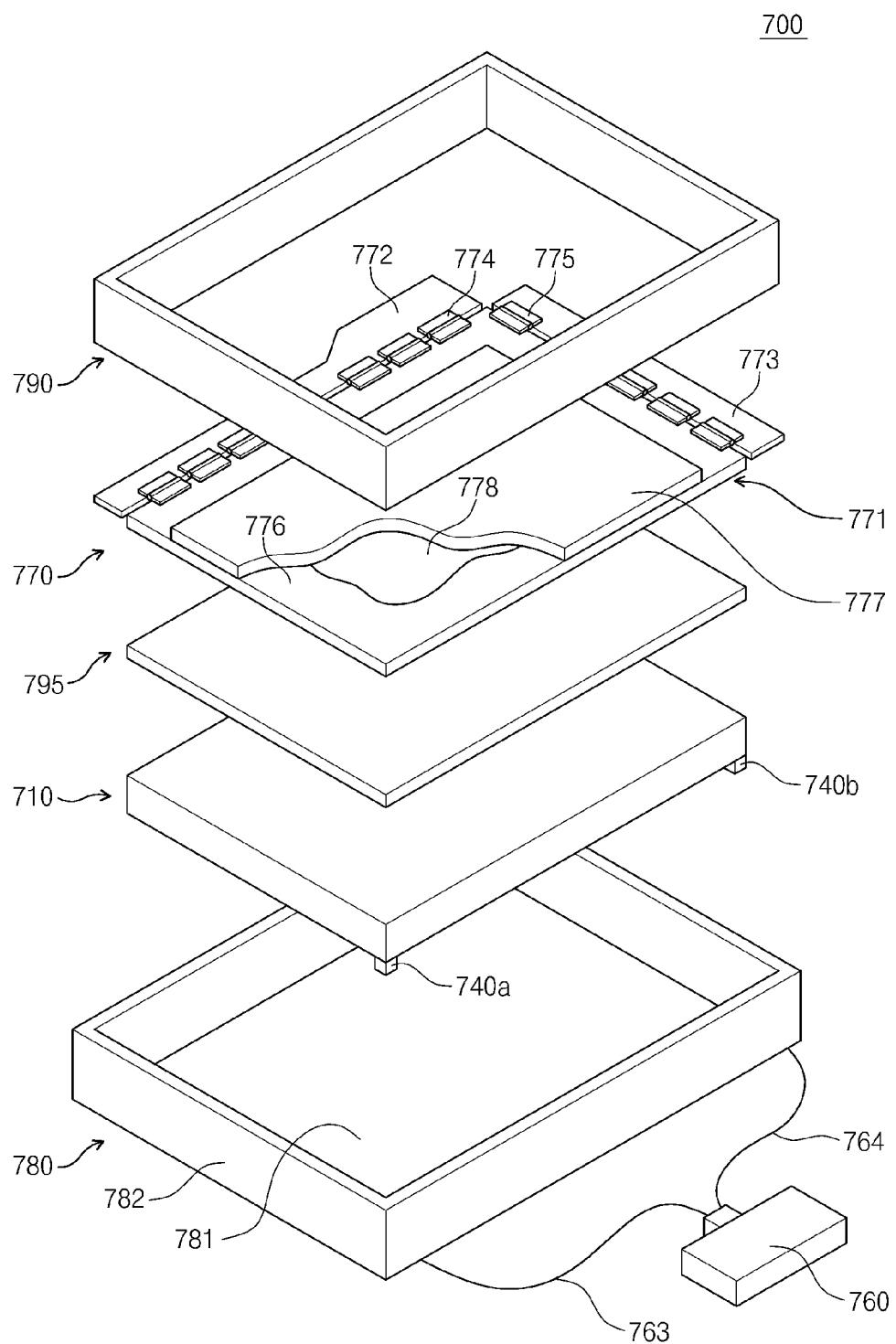
FIG. 11 is an exploded perspective view of an LCD according to still another alternative exemplary embodiment of the present invention.

FIG. 11 is an exploded perspective view an LCD according to an alternative exemplary embodiment of the present invention. Specifically, FIG. 11 shows a mechanical structure of an LCD according to an exemplary embodiment of the present invention. Referring to FIG. 11, an LCD 700 includes a backlight assembly 710, a display unit 770 and a lower container 780.

The display unit 770 includes a liquid crystal display panel 771 which displays an image, a data printed circuit board ("PCB") 772 and a gate PCB 773 which output driving signals to drive the liquid crystal display panel 771. The data PCB 772 and the gate PCB 773 are electrically connected to the liquid crystal display panel 771 through a data tape carrier package ("TCP") 774 and a gate TCP 775, respectively.

The liquid crystal display panel 771 includes a thin film transistor ("TFT") substrate 776, a color filter substrate 777 coupled to the TFT substrate 776 and facing the TFT substrate 776, and liquid crystals 778 interposed between the TFT substrate 776 and the color filter substrate 777.

The TFT substrate 776 includes, for example, a transparent glass substrate in which TFTs (not shown) serving as switching devices are formed in a substantially matrix pattern. Data lines and gate lines are connected to source and gate terminals of the TFT, respectively, and a pixel electrode (not shown) including a transparent conductive material, for example, is formed connected to a drain terminal thereof.

The color filter substrate 777 includes a substrate in which red, green and blue ("RGB") pixels (e.g., color pixels), for example, are formed through a thin film process. The color filter substrate 777 has a common electrode (not shown) including transparent conductive material.

The lower container 780 includes a bottom surface 781 and sidewalls 782 which form a receiving space defined by edges thereof in contact with the bottom surface 781. Thus, the lower container 780 securely receives and fixes the backlight assembly 710 and the liquid crystal display panel 771.

In an exemplary embodiment, the bottom surface 781 has an area sufficient to receive the backlight assembly 710 therein, and has a substantially same construction as a construction of the backlight assembly 710. In an exemplary embodiment of the present invention, the bottom surface 781 and the backlight assembly 710 form a substantially rectangular, e.g., plate shape. Further, the sidewalls 782 extend substantially vertically from the edges of the bottom surface 781, such that the backlight assembly 710 is effectively prevented from being separated from the lower container 780 and thereby damaged.

According to an exemplary embodiment, the LCD 700 further includes an inverter 760 and an upper container 790.

The inverter 760 is disposed outside the lower container 780 to generate a discharge voltage used to drive the backlight assembly 710. The discharge voltage generated from the inverter 760 is applied to the backlight assembly 710 through a first power supply line 763 and a second power supply line 764. The first power supply line 763 and the second power supply line 764 are directly connected with a first electrode 740a and a second electrode 740b formed at sides of the backlight assembly 710, as shown in FIG. 11. Further, the first power supply line 763 and the second power supply line 764 are connected to the first electrode 740a and the second electrode 740b via additional members (not shown).

Further, the drive circuit 10, the inverter transformer 11, the backlight unit 502, the high pass filter circuit 12, the differential circuit 13, the serial resonant circuit 14, the detection circuit 15, the peak hold circuit 16, the level detection circuit 17, the arc discharge determiner 18, the oscillator 601 and the controller 602 are accommodated in the inverter 760.

The upper container 790 is coupled to the lower container 780, thereby surrounding edges of the liquid crystal display panel 771 to protect the same. The upper container 790 thereby effectively prevents the liquid crystal display panel 771 from being damaged or broken by an external impact, for example, and effectively prevents the liquid crystal display panel 771 from being separated from the lower container 780.

The LCD 700 according to an exemplary embodiment of the present invention may further include at least one optical sheet 795 which improves characteristics of light emitted from the backlight assembly 710. The optical sheet 795 may include a diffusion sheet which diffuses light and/or a prism sheet which collects light.

Thus, according to exemplary embodiments of an LCD including a concentrative power supply-type inverter as described herein, when an arc discharge has occurred around a CCFL group, arc noise components generated from the output current applied to the supply line of the high AC voltage can be detected. Further, when the arc discharge has occurred, a control circuit, which controls an operation of an inverter circuit, outputs an abnormal discharge detection signal. As a result, when the arc discharge has occurred, the operation of the inverter circuit is immediately stopped, and parts in a backlight device having the inverter are thereby effectively prevented from being damaged by the arc discharge.

Furthermore, the backlight device according to exemplary embodiments described herein employs a concentrative power supply-type inverter circuit using a balance condenser. However, the scope of the present invention is not limited thereto. For example, a concentrative power supply-type inverter circuit having a different construction may be applied in an alternative exemplary embodiment of the present invention.

In addition, the backlight device according to the exemplary embodiments described herein detects the arc discharge occurring in the backlight unit. However, the scope of the present invention is not limited thereto. Specifically, the backlight device according to an alternative exemplary embodiment of the present invention detects a high-voltage abnormal discharge, such as a corona discharge, for example, as well as the arc discharge.

Figure 12:
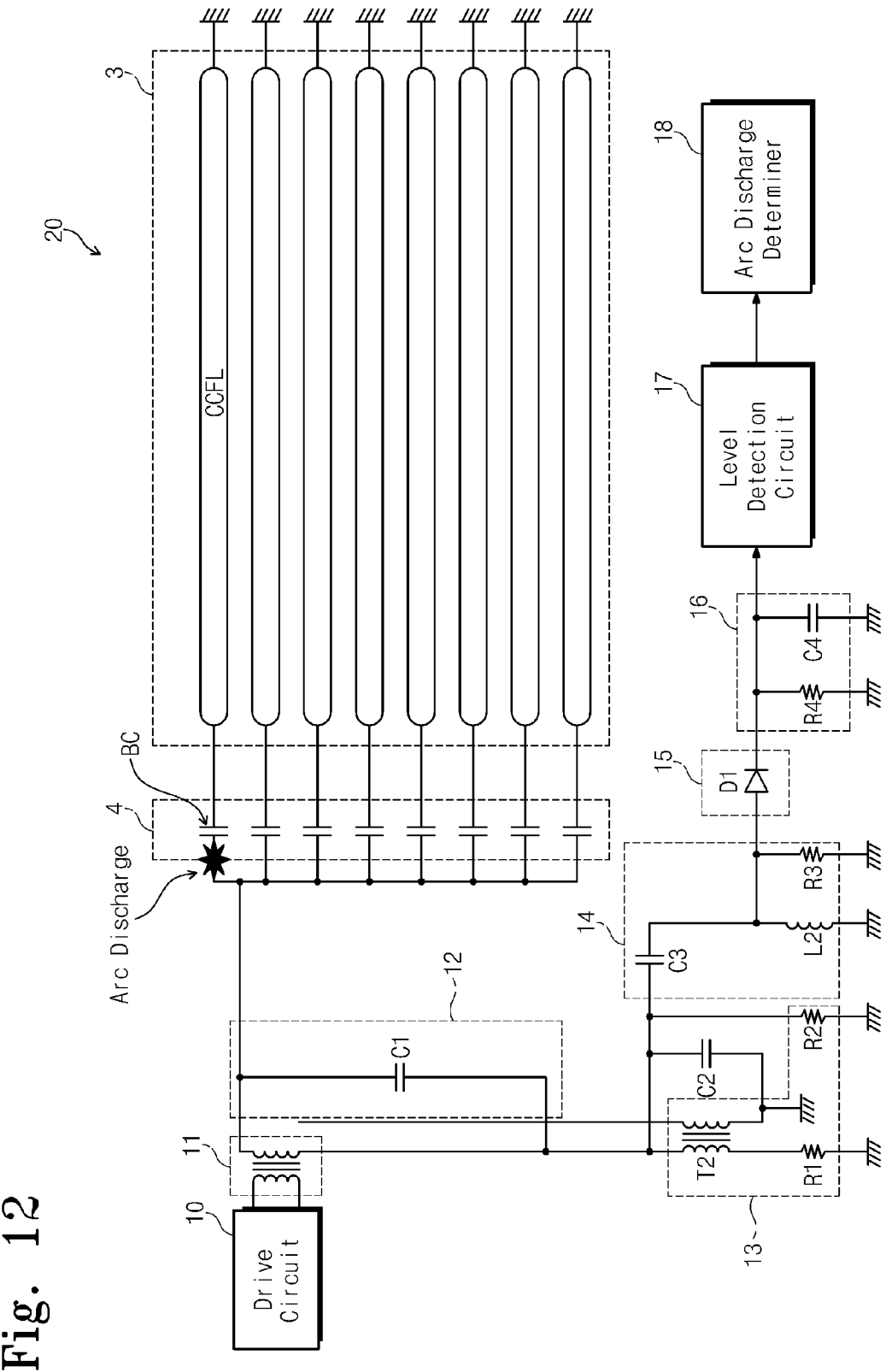
FIG. 12 is a schematic circuit diagram of an inverter circuit of a backlight device according to another alternative exemplary embodiment of the present invention.

Moreover, in the backlight device 20 according to the exemplary embodiments described herein, a differential circuit includes a second coil, a first resistor and a second resistor R2. However, the scope of the present invention is not limited thereto. Thus, an alternative exemplary embodiment of the present invention includes a differential circuit which has a current detection transformer, a first resistor R1 and a second resistor R2 as shown in FIG. 12, which is a schematic circuit diagram of an inverter circuit of a backlight device according to yet another alternative exemplary embodiment of the present invention. In this case, the current detection transformer T2 may be installed on a substrate on which the CCFL group 3 and/or the condenser circuit 4 are mounted. Thus, the substrate serves as a CCFL assembly separate from an inverter circuit substrate. Thus, the CCFL assembly may be separately supplied to a user who does not need the inverter circuit substrate.

The present invention should not be construed as being limited to the exemplary embodiments set forth herein. Rather, these exemplary embodiments are provided so that this disclosure will be thorough and complete and will fully convey the concept of the present invention to those skilled in the art.

Although exemplary embodiments of the present invention have been particularly shown and described, it will be understood by those of ordinary skill in the art that various changes and modifications in form and details may be made therein without departing from the spirit and/or scope of the present invention as defined by the following claims.

What is claimed is:

1. An inverter circuit comprising:
   an inverter transformer which supplies a high AC voltage to a plurality of discharge tubes;
   a filter circuit connected to an output terminal of the inverter transformer to pass a current signal having a high frequency component of the high AC voltage; and
   an abnormal discharge detection circuit connected to the filter circuit to receive the current signal and detect an abnormal discharge current based on the current signal,
   wherein the abnormal discharge detection circuit comprises:
      a differential circuit connected to an output terminal of the filter circuit to output a differential signal based on the current signal having the high frequency component of the high AC voltage;
      a serial resonant circuit connected to an output terminal of the differential circuit to amplify the differential signal and output an amplified differential signal;
      a detection circuit connected to an output terminal of the serial resonant circuit to receive the amplified differential signal therefrom and output a detection signal based on the amplified differential signal;
      a peak hold circuit connected to an output terminal of the detection circuit to maintain a peak level of the detection signal; and
      a level detection circuit connected to an output terminal of the peak hold circuit to detect the peak level maintained by the peak hold circuit.

2. The inverter circuit of claim 1, wherein the abnormal discharge detection circuit further comprises an arc discharge determiner connected to an output terminal of the level detection circuit to detect the abnormal discharge current based on the peak level detected by the level detection circuit.

3. The inverter circuit of claim 1, wherein the differential circuit comprises a current detection transformer connected to the output terminal of the filter circuit to detect the current signal having the high frequency component of the high AC voltage.

4. The inverter circuit of claim 1, wherein the filter circuit comprises a high pass filter.

5. The inverter circuit of claim 1, wherein
   the plurality of discharge tubes comprises a cold cathode fluorescent lamp, and
   an operation of the inverter transformer is controlled based on the abnormal discharge current detected by the abnormal discharge detection circuit.

6. A backlight device comprising:
   a plurality of discharge tubes;
   an inverter transformer which supplies a high AC voltage to the plurality of discharge tubes;
   a filter circuit connected to an output terminal of the inverter transformer to pass a current signal having a high frequency component of the high AC voltage; and
   an abnormal discharge detection circuit connected to the filter circuit to receive the current signal from the filter circuit and detect an abnormal discharge current based on the current signal, wherein the abnormal discharge detection circuit comprises:
  a differential circuit connected to an output terminal of the filter circuit to output a differential signal based on the current signal having the high frequency component of the high AC voltage;
  a serial resonant circuit connected to an output terminal of the differential circuit to amplify the differential signal and output an amplified differential signal;
  a detection circuit connected to an output terminal of the serial resonant circuit to receive the amplified differential signal therefrom and output a detection signal based on the amplified differential signal;
  a peak hold circuit connected to an output terminal of the detection circuit to maintain a peak level of the detection signal; and
  a level detection circuit connected to an output terminal of the peak hold circuit to detect the peak level maintained by the peak hold circuit.

7. The backlight device of claim 6, wherein the abnormal discharge detection circuit further comprises an arc discharge determiner connected to an output terminal of the level detection circuit to detect the abnormal discharge current based on the peak level detected by the level detection circuit.

8. The backlight device of claim 6, wherein the differential circuit comprises a current detection transformer connected to the output terminal of the filter circuit to detect the current signal having the high frequency component of the high AC voltage.

9. The backlight device of claim 6, wherein the filter circuit comprises a high pass filter.

10. The backlight device of claim 6, wherein
  the plurality of discharge tubes comprises a cold cathode fluorescent lamp, and
  an operation of the inverter transformer is controlled based on the abnormal discharge current detected by the abnormal discharge detection circuit.

11. A liquid crystal display comprising:
  a liquid crystal display panel which displays an image;
  a backlight unit including a plurality of discharge tubes; and
  an inverter circuit which drives the backlight unit,
  wherein the inverter circuit comprises:
    an inverter transformer which supplies a high AC voltage to the backlight unit;
    a filter circuit connected to an output terminal of the inverter transformer to pass a current signal having a high frequency component of the high AC voltage; and
    an abnormal discharge detection circuit connected to the filter circuit to receive the current signal from the filter circuit and detect an abnormal discharge current based on the current signal,
  wherein the abnormal discharge detection circuit comprises:
    a differential circuit connected to an output terminal of the filter circuit to output a differential signal based on the current signal having the high frequency component of the high AC voltage;
    a serial resonant circuit connected to an output terminal of the differential circuit to amplify the differential signal and output an amplified differential signal;
    a detection circuit connected to an output terminal of the serial resonant circuit to receive the amplified differential signal therefrom and output a detection signal based on the amplified differential signal;
    a peak hold circuit connected to an output terminal of the detection circuit to maintain a peak level of the detection signal; and
    a level detection circuit connected to an output terminal of the peak hold circuit to detect the peak level maintained by the peak hold circuit.

12. The liquid crystal display of claim 11, wherein the differential circuit comprises a current detection transformer connected to the output terminal of the filter circuit to detect the current signal having the high frequency component of the high AC voltage.

13. The liquid crystal display of claim 11, wherein the abnormal discharge detection circuit further comprises:
  a drive circuit which drives the inverter transformer;
  an arc discharge determiner connected to an output terminal of the level detection circuit to detect the abnormal discharge current based on the peak level detected by the level detection circuit; and
  a controller which stops an operation of the drive circuit when the arc discharge determiner determines that an arc discharge has occurred.

14. The liquid crystal display of claim 11, wherein the filter circuit comprises a high pass filter.

15. A liquid crystal display comprising:
  a liquid crystal display panel which displays an image;
  a backlight assembly including a plurality of discharge tubes;
  a lower container which receives the backlight assembly;
  an upper container which prevents the liquid crystal display panel from being damaged;
  an inverter which drives the backlight assembly; and
  at least one optical sheet interposed between the liquid crystal display panel and the backlight assembly,
  wherein the inverter comprises:
    an inverter transformer which supplies a high AC voltage to the backlight assembly;
    a filter circuit connected to an output terminal of the inverter transformer to pass a current signal having a high frequency component of the high AC voltage; and
    an abnormal discharge detection circuit connected to the filter circuit to receive the current signal from the filter circuit and detect an abnormal discharge current based on the current signal,
  wherein the abnormal discharge detection circuit comprises:
    a differential circuit connected to an output terminal of the filter circuit to output a differential signal based on the current signal having the high frequency component of the high AC voltage;
    a serial resonant circuit connected to an output terminal of the differential circuit to amplify the differential signal and output an amplified differential signal;
    a detection circuit connected to an output terminal of the serial resonant circuit to receive the amplified differential signal therefrom and output a detection signal based on the amplified differential signal;

a peak hold circuit connected to an output terminal of the detection circuit to maintain a peak level of the detection signal; and a level detection circuit connected to an output terminal of the peak hold circuit to detect the peak level maintained by the peak hold circuit.

16. The liquid crystal display of claim 15, wherein the differential circuit comprises a current detection transformer connected to the output terminal of the filter circuit to detect the current signal having the high frequency component of the high AC voltage.

17. The liquid crystal display of claim 15, wherein the abnormal discharge detection circuit further comprises:

a drive circuit which drives the inverter transformer;

an arc discharge determiner connected to an output terminal of the level detection circuit to detect the abnormal discharge current based on the peak level detected by the level detection circuit; and a controller which stops an operation of the drive circuit when the arc discharge determiner determines that an arc discharge has occurred.

18. The liquid crystal display of claim 15, wherein the filter circuit comprises a high pass filter.

* * * * *